US011329414B2

(12) United States Patent
Zhang et al.

(10) Patent No.: US 11,329,414 B2
(45) Date of Patent: May 10, 2022

(54) CONDUCTIVE RECEPTACLE COLLAR FOR DESENSE MITIGATION

(71) Applicant: Google LLC, Mountain View, CA (US)

(72) Inventors: Yichi Zhang, San Jose, CA (US); Songping Wu, Mountain View, CA (US); Shuai Jin, San Jose, CA (US); Huan Liao, San Jose, CA (US); Zhiping Yang, Campbell, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/015,681

(22) Filed: Sep. 9, 2020

(65) Prior Publication Data

US 2022/0077617 A1 Mar. 10, 2022

(51) Int. Cl.

| | |
|---|---|
| ***H01R 13/05*** | (2006.01) |
| ***H01R 13/502*** | (2006.01) |
| ***H01R 12/71*** | (2011.01) |
| ***H01R 12/70*** | (2011.01) |
| ***H04B 1/06*** | (2006.01) |
| ***H01R 13/639*** | (2006.01) |
| ***H01R 24/60*** | (2011.01) |

(Continued)

(52) U.S. Cl.
CPC ......... *H01R 13/05* (2013.01); *H01R 12/7005* (2013.01); *H01R 12/71* (2013.01); *H01R 13/502* (2013.01); *H01R 13/639* (2013.01); *H01R 13/642* (2013.01); *H01R 24/60* (2013.01); *H04B 1/06* (2013.01); *H04B 1/38* (2013.01)

(58) Field of Classification Search
CPC ..... H01R 13/05; H01R 12/7005; H01R 12/71
USPC .......................................................... 439/816
See application file for complete search history.

(56) References Cited

U.S. PATENT DOCUMENTS 8,882,524 B2 11/2014 Golko et al.
9,223,346 B2 * 12/2015 Wilson .................. G06F 1/1633
9,337,528 B2 * 5/2016 Hammond ............... H01Q 1/44

(Continued)

FOREIGN PATENT DOCUMENTS

WO 2019063331 4/2019

OTHER PUBLICATIONS

"USB-C Means "One Cable for All" Make Magic with Plastic", ForTii DSM—Bright Science. Brighter Living, 2015, 4 pages.

(Continued)

*Primary Examiner* — Alexander Gilman
(74) *Attorney, Agent, or Firm* — Colby Nipper PLLC

(57) ABSTRACT

The present disclosure describes aspects of a conductive receptacle collar for desense mitigation. In aspects, an apparatus comprises a printed circuit board assembly (PCBA) that includes an integrated circuit with signal lines for a wired data interface. The apparatus also includes a coupling component with a receptacle for the wired data interface and an enclosure in which the PCBA is mounted. The enclosure has an opening through which the receptacle for the wired data interface is exposed. A conductive collar is disposed between an exterior surface of the receptacle and an interior surface of this opening. The conductive collar contacts the receptacle's exterior surface and the interior surface of the opening to electrically couple these respective surfaces. By so doing, the conductive collar improves grounding of the receptacle to the enclosure, which may mitigate the desense of the apparatus's wireless receivers caused by operation of the wired data interface.

12 Claims, 10 Drawing Sheets

(51) Int. Cl.
*H04B 1/38* (2015.01)
*H01R 13/642* (2006.01)

(56) References Cited

U.S. PATENT DOCUMENTS

| | | | | |
|---|---|---|---|---|
| 9,444,506 | B2 | 9/2016 | Lai et al. | |
| 9,615,476 | B2 | 4/2017 | Rayner et al. | |
| 10,008,870 | B2 | 6/2018 | Davison et al. | |
| 10,170,864 | B1 * | 1/2019 | Hsu | H01R 13/521 |
| 10,218,126 | B2 * | 2/2019 | Kurosawa | H01R 24/60 |
| 10,361,518 | B2 * | 7/2019 | Zhang | H01R 13/6585 |
| 10,367,538 | B2 * | 7/2019 | Lai | H04M 1/026 |
| 10,931,065 | B2 * | 2/2021 | Hirakawa | H01R 12/55 |
| 10,944,229 | B2 * | 3/2021 | Su | H01R 13/6585 |
| 2009/0228608 | A1 * | 9/2009 | Nysen | H01Q 1/50 710/1 |
| 2013/0294020 | A1 * | 11/2013 | Rayner | G06F 1/1626 361/679.01 |
| 2015/0270734 | A1 * | 9/2015 | Davison | H04B 1/1607 320/103 |
| 2015/0295617 | A1 * | 10/2015 | Lai | H04B 1/3888 455/575.8 |
| 2018/0109042 | A1 * | 4/2018 | Little | H01R 13/405 |
| 2018/0287288 | A1 * | 10/2018 | Shah | H01R 13/504 |
| 2019/0237912 | A1 * | 8/2019 | Little | H01R 13/6585 |
| 2021/0024081 | A1 * | 1/2021 | Johnson-Roberson | G01C 21/3807 |

OTHER PUBLICATIONS

Dondzik, “Adhesiveless Display Panel Attachment”, Technical Disclosure Commons; Retrieved from https://www.tdcommons.org/dpubs_series/3307, Jun. 9, 2020, 8 pages.

Rosen, “Waterproof, User-Removable Casings for Electronic Devices”, Technical Disclosure Commons; Retrieved from https://www.tdcommons.org/dpubs_series/3323, Jun. 15, 2020, 8 pages.

Wakser, et al., “Form-in-Place Adhesive Gasket to Waterproof an Electronic Device”, Technical Disclosure Commons; Retrieved from https://www.tdcommons.org/dpubs_series/3239, May 18, 2020, 7 pages.

* cited by examiner

500

| Line | Device Under Test (DUT) Configuration |
|---|---|
| 502 | Baseline - Inactive USB Connection |
| 504 | DUT without Conductive Collar |
| 506 | DUT with Conductive Collar |

550

| Channel | Noise (dBm) | | Improvement (dBm) |
|---|---|---|---|
| 1 (2412 MHz) | -74 | -83 | 9 |
| 6 (2437 MHz) | -75 | -85 | 10 |
| 11 (2462 MHz) | -76 | -87 | 11 |
| | With Collar | Without Collar | |

CONDUCTIVE RECEPTACLE COLLAR FOR DESENSE MITIGATION

BACKGROUND

Electronic and computing devices often include wired and wireless data interfaces that enable communication with other devices or user interaction. For example, a device may include a wireless transceiver to transmit and receive data through wireless signals, as well as a wired transceiver to communicate data via a wired connection. In some cases, the wireless transceiver and the wired transceiver operate in similar frequency ranges, or the operation of one transceiver generates noise in a frequency band in which the other transceiver operates. Oftentimes, noise generated at a connector of the wired transceiver propagates through or across a device housing and couples to an antenna or coax cable of the wireless transceiver. Due to a relative difference in power levels, this noise can interfere with the ability of the wireless transceiver to receive (e.g., receiver sensitivity) wireless signals, which are typically much lower in power than the conducted noise generated by the wired transceiver. As such, the use of the device's wired transceiver can generate noise that degrades the performance of the wireless transceiver, resulting in decreased wireless data rates or loss of a wireless connection with another device.

SUMMARY

This disclosure describes aspects of a conductive receptacle collar for desense mitigation. In some aspects, an apparatus comprises a printed circuit board assembly (PCBA) that includes an integrated circuit (IC) with signal lines for a wired data interface. The apparatus also includes a coupling component with a receptacle for the wired data interface and an enclosure in which the PCBA is mounted. The enclosure has an opening through which the receptacle for the wired data interface is exposed. A conductive collar is disposed between an exterior surface of the receptacle and an interior surface of the opening of the enclosure. The conductive collar contacts the exterior surface of the receptacle and the interior surface of the opening to electrically couple the respective surfaces. By so doing, the conductive collar improves grounding of the receptacle to the enclosure, which may reduce high-mode current flow across the enclosure and/or mitigate desense of the apparatus's wireless receiver(s) caused by use of the wired data interface.

In some aspects, an apparatus comprises a PCBA that includes an IC with signal lines for a wired data interface. A coupling component of the apparatus includes a receptacle for the wired data interface having contacts electrically coupled to the signal lines of the IC. The apparatus includes an enclosure in which the PCBA is mounted, which includes an opening through which the receptacle for the wired data interface is exposed. A conductive collar of the receptacle is disposed between an exterior surface of the receptacle and an interior surface of the opening of the enclosure. The conductive collar contacts the exterior surface of the receptacle and the interior surface of the opening of the enclosure. This can be effective to improve grounding between the receptacle and the housing, which may, in turn, reduce the desense of a wireless receiver of the apparatus that is caused by the use of the wired data interface.

The details of one or more implementations of a conductive receptacle collar for desense mitigation are set forth in the accompanying drawings and the following description. Other features and advantages will be apparent from the description, the drawings, and the claims. This Summary is provided to introduce subject matter that is further described in the Detailed Description and Drawings. Accordingly, this Summary should not be considered to describe essential features nor used to limit the scope of the claimed subject matter.

BRIEF DESCRIPTION OF THE DRAWINGS

This specification describes aspects of a conductive receptacle collar for desense mitigation with reference to the following drawings. The same numbers are used throughout the drawings to reference like features and components.

DETAILED DESCRIPTION

Figure 1:
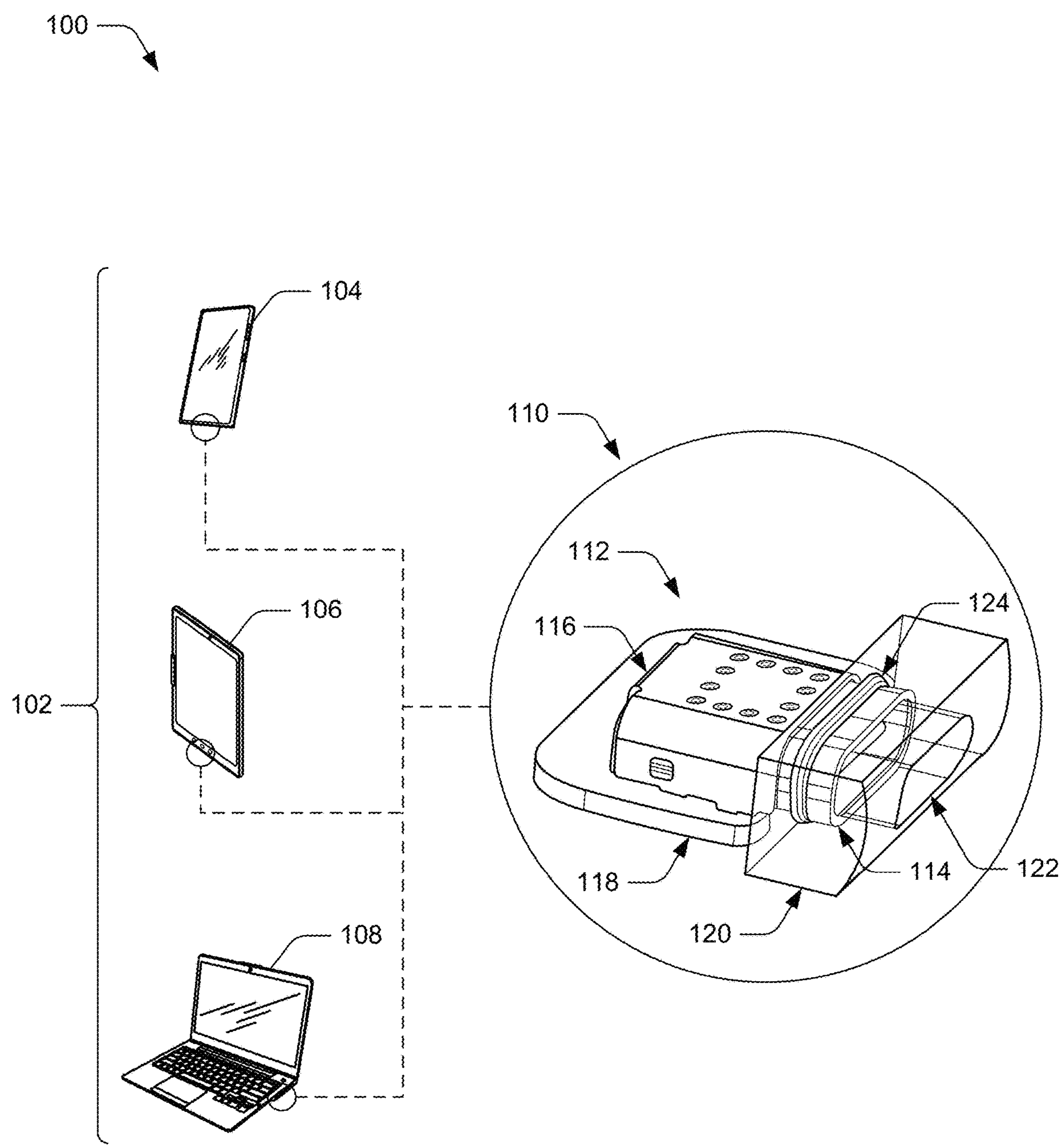
FIG. 1 illustrates an example environment that includes various user devices in which a conductive receptacle collar can be implemented.

Electronic and computing devices often include wired and wireless data interfaces that enable communication with other devices or user interaction. For example, a device may include a wireless transceiver to transmit and receive data through wireless signals, as well as a wired transceiver to communicate data via a wired connection. In some cases, the wireless transceiver and the wired transceiver operate in similar frequency ranges or the operation of one transceiver generates noise in a frequency band in which the other transceiver operates. Oftentimes, noise generated at a connector of the wired transceiver propagates through or across a device housing and couples to an antenna or coax cable of the wireless transceiver. Due to a relative difference in power levels, this noise can interfere with the ability of the wireless transceiver to receive (e.g., receiver sensitivity) wireless signals, which are typically much lower in power than the conducted noise generated by the wired transceiver. As such, the use of the device's wired transceiver can generate noise that degrades the performance of the wireless transceiver, resulting in decreased wireless data rates or loss of a wireless connection with another device.

By way of example, many electronic devices include a wireless local area network (WLAN) radio module and a Universal Serial Bus (USB) controller for wireless communication and wired communication, respectively. Typically, an antenna for the WLAN radio module and a connector for the USB connector are positioned proximate to an external surface of a housing of a device. This enables the antenna to communicate wireless signals with minimal obstructions and allows users to plug a USB cable into the USB connector. Placing the USB connector and the antenna of the WLAN module in close proximity or near the housing of the device, however, can allow high-mode currents (e.g., noise) generated by the operation of the USB interface to reach the antenna by traveling or propagating along the housing. This issue is often associated with poor grounding at points between the USB connector and the housing of the device, which permits the coupling of the USB-generated noise to the antenna of the WLAN module. Because some classes of USB, such as USB 3.0 SuperSpeed, operate at or generate harmonics in a frequency band of the WLAN module, noise (e.g., electromagnetic interference (EMI)) caused by the operation of the USB interface may interfere with receiver performance of the WLAN module. Generally, this loss or impairment in receiver sensitivity due to noise may be referred to as receiver "desense." In some cases, the noise from an active USB 3.0 SuperSpeed connection may cause up to 20 dB of desense in a WLAN receiver. As such, the noise generated by the operation of the device's USB interface can degrade WLAN receiver performance, which can reduce wireless data rates or result in dropped wireless connections.

This document describes apparatuses and techniques for a conductive receptacle collar for desense mitigation. In contrast with preceding off-the-shelf connectors, the described aspects of a conductive receptacle collar enable improved grounding between a coupling component, such as a USB connector, of a device and an enclosure of the device. By so doing, noise generated by a wired data interface associated with the coupling component may be prevented from propagating across the enclosure and interfering with a wireless interface of the device. For example, a conductive collar disposed between a USB receptacle and an enclosure of a device can provide a path for noise generated by an active USB connection to a ground reference on the enclosure or a chassis of a device, thereby reducing an amount of the noise that reaches an antenna of the device.

In some aspects, a USB connector (e.g., USB Type-C connector) of a device includes a receptacle with a conductive collar disposed around the receptacle. The conductive collar can be formed from a conductive elastomeric material, which is flexible and provides an electrical connection between an exposed conductive inner surface of an enclosure of the device and an exterior surface of the receptacle. In some cases, the conductive collar is in contact with the surface of the USB receptacle over an entire circumference or perimeter of the receptacle. Alternatively or additionally, a dimple feature or channel feature formed in the interior surface of the enclosure may ensure compression of the conductive collar for a consistent electrical connection between the receptacle and the enclosure of the device.

In addition to reducing noise or reducing desense of a co-located wireless transceiver, the conductive receptacle collar described herein is generally compatible with and extendable to many industry-standard USB receptacle designs. In other words, various aspects of the conductive receptacle collar can be incorporated into existing receptacle designs without impairing the receptacle's functionality with a standards-compliant plug (e.g., maintaining standards-based compatibility). As such, the conductive receptacle collar enables common coexistence use-cases for USB and WLAN, while providing improved wireless performance (e.g., doubled effective range) relative preceding USB connector designs.

In some aspects, the described conductive receptacle collar is implemented in an apparatus with a PCBA that includes an IC with signal lines for a wired data interface. A coupling component of the apparatus includes a receptacle for the wired data interface having contacts electrically coupled to the signal lines of the IC. The apparatus includes an enclosure in which the PCBA is mounted, which includes an opening through which the receptacle for the wired data interface is exposed. A conductive collar of the receptacle is disposed between an exterior surface of the receptacle and an interior surface of the opening of the enclosure. The conductive collar contacts both the exterior surface of the receptacle and the interior surface of the opening of the enclosure. This can be effective to improve grounding between the receptacle and the housing, which may, in turn, reduce the desense of a wireless receiver of the apparatus that is caused by the use of the wired data interface.

While features and concepts of the described apparatuses and techniques for a conductive receptacle collar can be implemented in any number of different environments, systems, devices, and/or various configurations, various aspects of a conductive receptacle collar are described in the context of the following example components, configurations, methods, and devices.

Example Environment

FIG. 1 illustrates an example environment 100 that includes a user device 102 in which aspects of a conductive receptacle collar can be implemented. The user device 102 may be implemented as any suitable device, some of which are illustrated as a smart-phone 104, a tablet computer 106, a laptop computer 108. Although not shown, the user device 102 may also be implemented as any a wearable computing device (e.g., smart-watch), a mobile station (e.g., fixed- or mobile-STA), a mobile communication device, a client device, a user equipment, a mobile phone, an entertainment device, a gaming device, a mobile gaming console, a personal media device, a media playback device, a health monitoring device, a drone, a camera, a wearable smart-device, an Internet home appliance capable of wireless Internet access and browsing, an IoT device, and/or other types of user devices. The user device 102 may provide other functions or include components or interfaces omitted from FIG. 1 for the sake of clarity or visual brevity. In aspects, the user device 102 may be implemented with similar components and configurations of a user device 1000 as described with reference to FIG. 10. Although referred to as user devices, the various devices and components described herein may also be implemented as systems or apparatuses in which a conductive receptacle collar can be implemented.

In aspects, the user device 102 includes a printed circuit board assembly (PCBA) on which respective transceiver integrated circuits (ICs, not shown) for a wired data interface and a wireless network interface are implemented. An enclosure or housing of the user device 102 may support and surround the PCBA, as well as support other components (e.g., a display) of the user device that are not attached to the PCBA. For example, the user device 102 may include a wireless local area network (WLAN) transceiver IC that is coupled to one or more antennas mounted to the enclosure of the user device. In some cases, the enclosure of the user device 102 includes respective mounting features (e.g., stand-offs) to which the antennas of the WLAN transceiver IC are mounted. The user device 102 may also include a USB controller IC with multiple USB interfaces electrically coupled to internal ports or external ports of the user device. Additionally or alternatively, the user device 102 can include other controllers for wired data interfaces, which may be configured to implement a Display Port™ interface protocol, a Thunderbolt™ interface protocol, or the like.

As shown in FIG. 1, the user device 102 includes a port connector 110 (e.g., USB connector) for a wired data interface of the user device that is exposed for connection. In this example, the port connector 110 includes a coupling component 112 for a USB interface of the user device 102. The coupling component 112 includes a receptacle 114 and a component housing 116 that is mounted to a printed circuit board 118 (PCB 118) of the user device 102. Although not shown, multiple signal lines (e.g., traces) of the PCB 118 electrically couple the IC of the wired data interface (e.g., USB controller) to pins of the coupling component 112, which in turn route to contacts of the receptacle 114. Generally, the enclosure 120 of the user device 102 includes an opening 122 or cavity through which the receptacle 114 is exposed to receive a mating coupling component (e.g., USB plug). In various aspects, a conductive collar 124 is disposed between an exterior surface of the receptacle 114 and an interior surface of the opening of the enclosure 120. Thus, the conductive collar 124 contacts both the exterior surface of the receptacle 114 and the interior surface of the opening 122 of the enclosure. By so doing, the conductive collar 124 may mitigate the desense of the wireless network interface caused in association with data that is transferred via the wired data interface.

Figure 2:
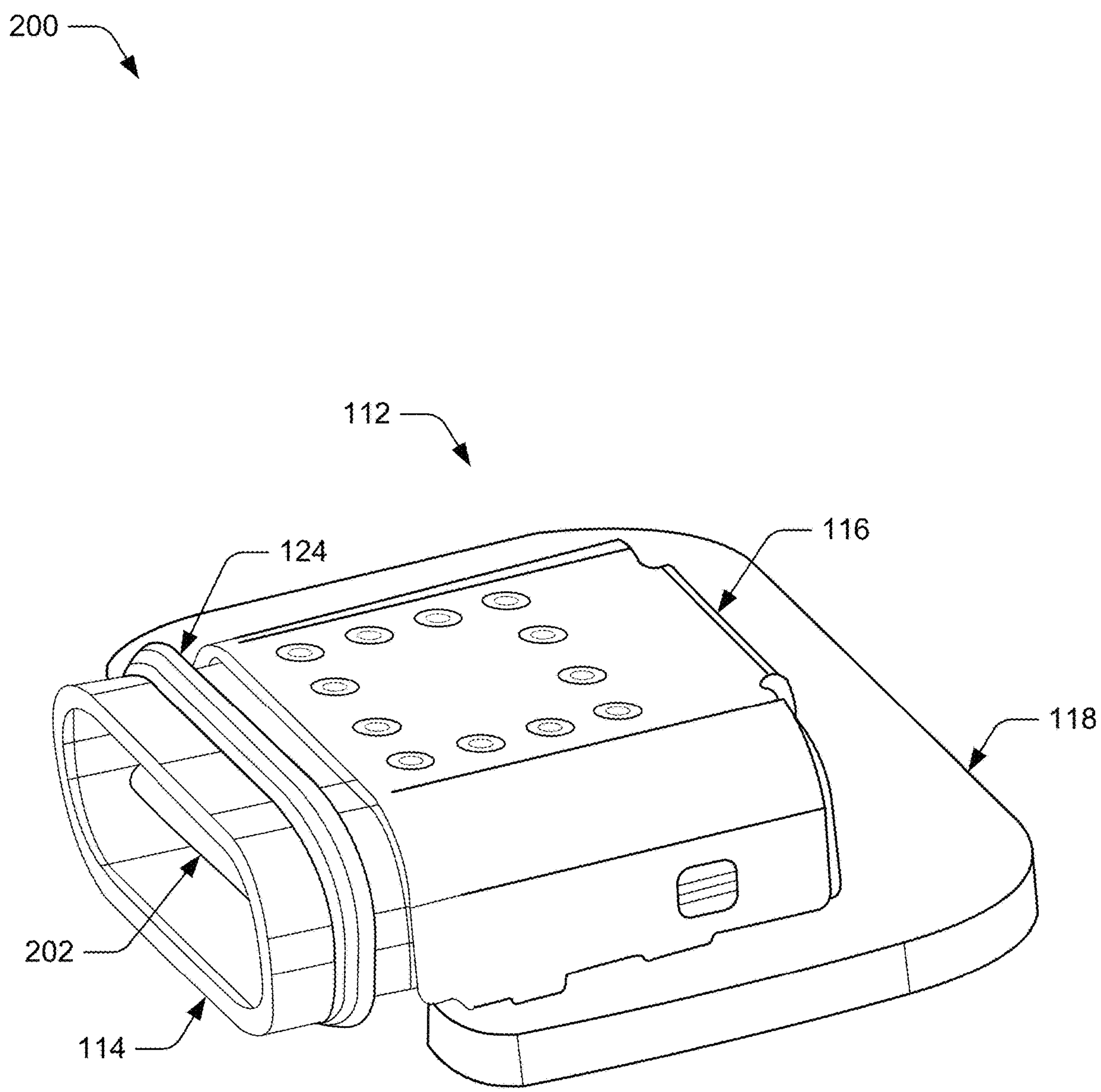
FIG. 2 illustrates an example of the coupling component of FIG. 1 that includes a receptacle and a conductive collar implemented in accordance with one or more aspects.

FIG. 2 illustrates at 200 an example of the coupling component of FIG. 1 that includes a receptacle and a conductive collar implemented in accordance with one or more aspects. The coupling component 112 can be implemented as any suitable type of wired data interface connector, which may include a USB connector, a Thunderbolt™ connector, a Display Port™ connector, or the like. In this example, the coupling component 112 is implemented as a USB Type-C connector that includes a housing 116 formed from a metallic material, such as steel or aluminum. The housing 116 may include mounting or index features (e.g., thru-hole legs or pins) by which the housing 116 is attached (e.g., soldered) to the PCB 118 of the user device 102. In some cases, the housing 116 and/or a frame of the coupling component 112 supports the receptacle 114 (e.g., shell) and an interior frame or tongue 202 of the receptacle 114 on which electrical contacts (not shown) for the wired data interface are mounted.

In aspects, a conductive collar 124 is formed, placed, or disposed around a circumference or perimeter of an exterior surface of the receptacle 114 of the coupling component. The exterior surface of the receptacle 114 may include a metallic surface or metallic coating, which effectively grounds the receptacle 114 to the PCB 118 through the housing 116 or ground pins of the coupling component 112. Additionally, the conductive collar 124 may act as a seal between the receptacle 114 and the housing 116, which may provide ingress protection against an intrusion of liquid (e.g., water). Thus, in some cases, the conductive collar 124 mitigates desense of a wireless network interface and also protects the user device 102 from the ingress of liquids (e.g., accidental water immersion).

Generally, the conductive collar 124 is formed from a flexible or non-rigid material, which may include an elastomeric material, a silicone rubber material, a fluoro-silicone rubber material, a rubber-based material, or the like. For conductivity, the conductive collar 124 can include particles, fragments, plated beads, pellets, or pieces of a conductive material. For example, the conductive collar 124 can include particles or a film formed with one or more of nickel, graphite, carbon, silver, aluminum, brass, bronze, copper, or beryllium. Accordingly, the conductive collar 124 may electrically couple or ground the receptacle 114 to other conductive surfaces with which the conductive collar 124 comes in contact.

Figure 3:
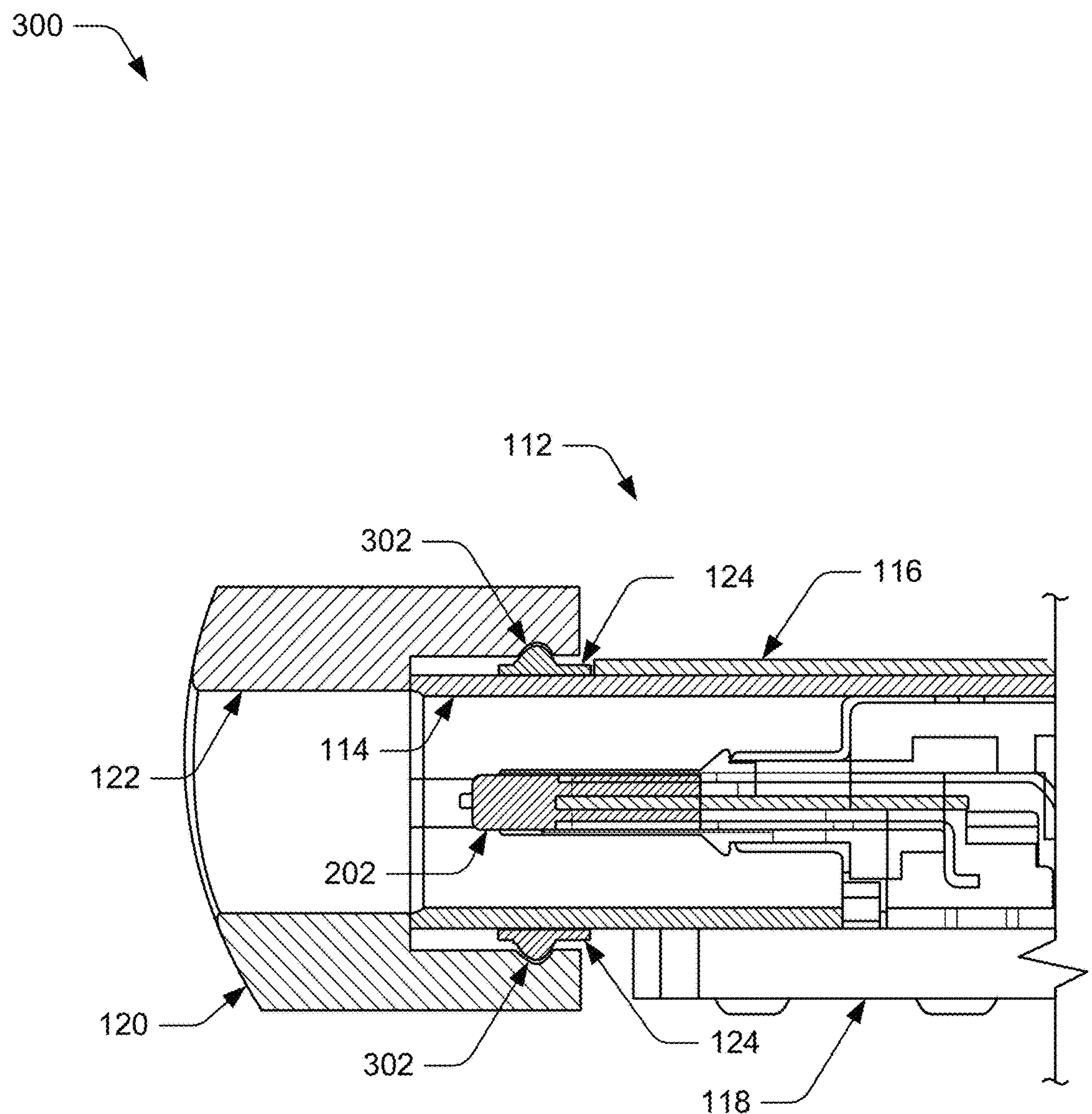
FIG. 3 illustrates a sectional elevation view of an example receptacle and conductive collar implemented in accordance aspects described herein.

FIG. 3 illustrates at 300 a sectional elevation view of an example receptacle and conductive collar implemented in accordance aspects described herein. In this example, a coupling component 112 is mounted to a PCB 118 of a user device such that a receptacle 114 is aligned with an opening 122 in an enclosure 120 of the user device 102. Generally, the receptacle 114 is positioned relative to the opening 122 to guide a mating coupling device (e.g., USB plug) into the receptacle 114 such that contacts of the mating coupling device engage an internal connector contact surface (e.g., the tongue 202) of the receptacle 114.

In aspects, a conductive collar 124 is disposed around an exterior surface of the receptacle 114 and contacts an interior surface of the opening 122 of the enclosure 120. The opening 122 of the enclosure 120 may include an opening through a conductive material of the enclosure 120 or be coated or plated with a conductive material that provides an electrical path to a chassis of the user device or the PCB 118. In some cases, the interior surface of the opening 122 includes a feature to index, position, receive, or retain the conductive collar 124. As shown in FIG. 3, the interior surface of the opening 122 includes a recess 302 (e.g., dimple, channel) configured to receive a complementary or corresponding feature in a profile of the conductive collar 124. Alternatively or additionally, the exterior surface of the receptacle 114 may include a feature to index, position, or retain the conductive collar. For example, the exterior surface of the receptacle 114 may include a protrusion (e.g., ridge, bump) formed on the exterior surface of the receptacle. In some cases, the housing 116 may also include or be configured with a feature by which the conductive collar 124 is positioned or held in place. In aspects, the conductive collar 124 may index relative an edge of the housing 116, which may assist in aligning the conductive collar 124 with the dimples 302 on the interior surface of the enclosure 120.

Figure 4:
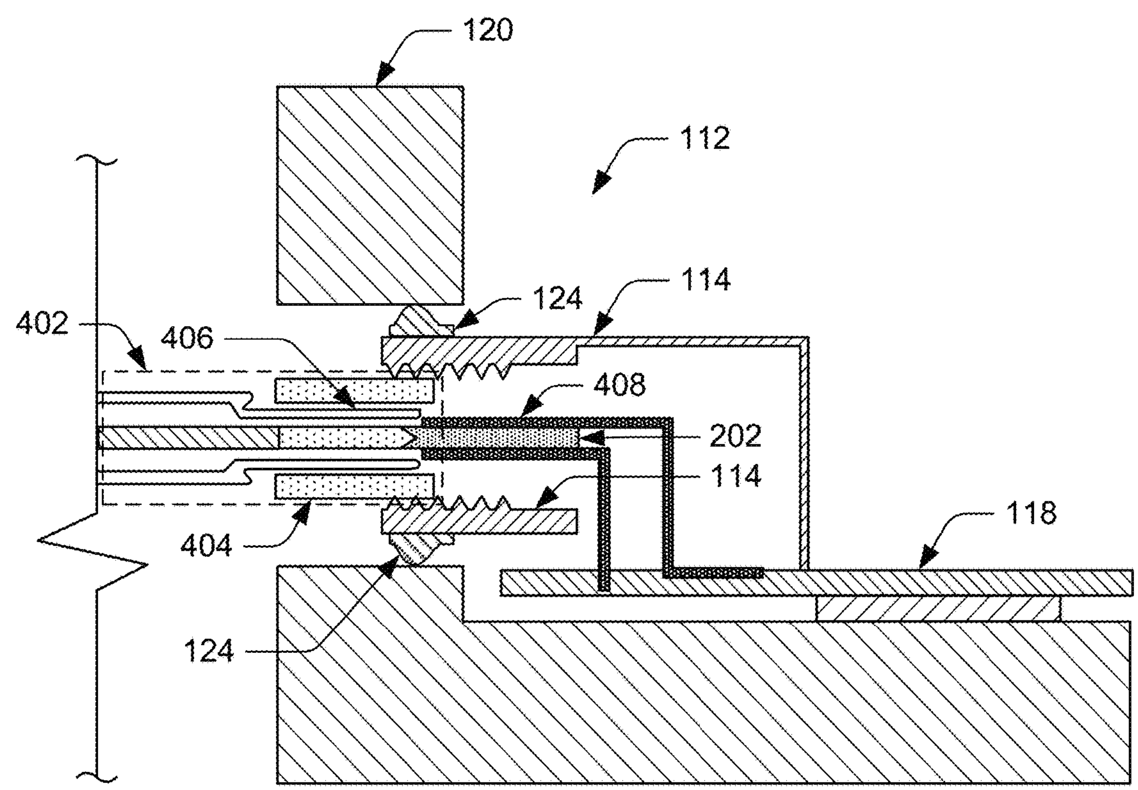
FIG. 4 illustrates another sectional elevation view of an example receptacle and plug coupled in accordance with one or more aspects.

FIG. 4 illustrates at 400 a sectional elevation view of an example receptacle and plug coupled in accordance with one or more aspects. In this example, the receptacle 114 of the coupling component 112 (e.g., USB connector) is shown partially coupled with a plug 402 of a mating coupling component (e.g., USB cable assembly). When the plug 402 engages the receptacle 114, a shell 404 of the plug 402 contacts an interior surface of the receptacle 114. With respect to electrically coupling signal lines of the plug 402, contacts 406 of the plug 402 engage with respective contacts 408 on the tongue 202 of the receptacle 114. During operation, data transfer through respective signal lines of the coupling component 112 and the mating coupling component may generate broadband noise (e.g., DC to 5 GHz) that is emitted from these signal lines.

In aspects, a conductive collar 124 provides an electrical or ground path for this noise from the receptacle 114 to the enclosure 120 of the user device 102, which may be formed from or plated with a conductive material. Alternatively or additionally, the enclosure 120 may electrically couple the interior surface of the opening 122 of the enclosure to at least one mounting point of the PCB 118. As such, the electrical path or ground path provided by the conductive collar 124 may prevent the noise (e.g., high-mode current) from propagating from the receptacle 114 to antennas of the user device 102, which may reduce desense of a wireless network interface, improve wireless performance of the user device, and improve wireless performance. Any of the features described with reference to FIGS. 1-4 may be combined to implement a conductive receptacle collar in accordance with the various aspects described herein.

Figures 5A, 5B:
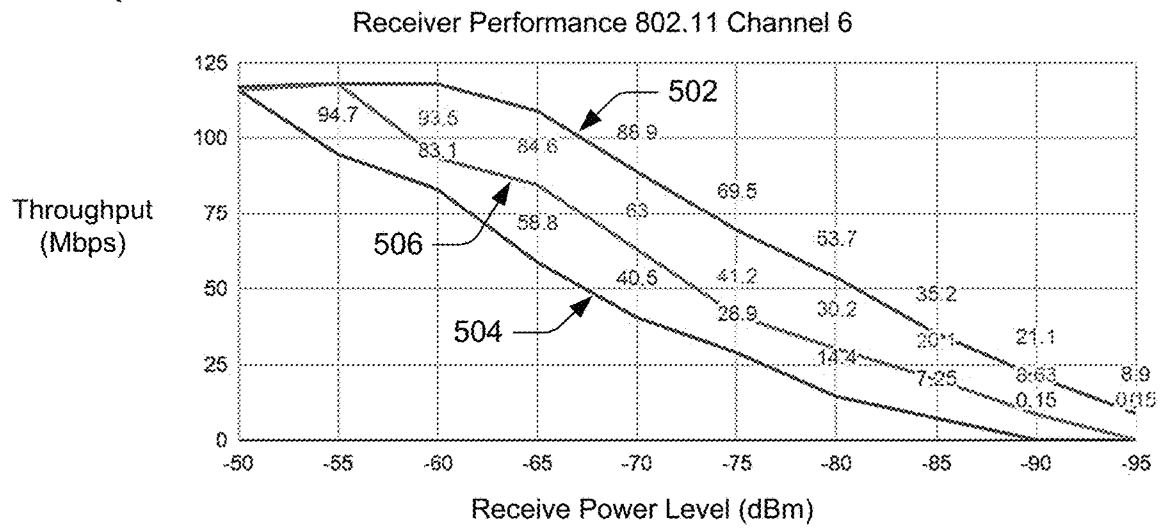
FIG. 5A depicts a graph of wireless receiver performance of a device that includes a conductive receptacle collar implemented in accordance with one or more aspects.
FIG. 5B depicts a table of example wireless receiver sensitivity metrics of a device that includes a conductive receptacle collar implemented as described herein.

FIG. 5A depicts at 500 a graph of wireless receiver performance of a device that includes a conductive receptacle collar implemented in accordance with one or more aspects. With reference to the graph at 500, a first line 502 indicates throughput (in megabits per second(Mbps)) of a wireless connection (e.g., WLAN) in relation to received signal power (in decibel-milliwatts (dBm)) while a wired data interface (e.g., USB 3.0) of a user device was inactive. A second line 504 indicates a reduction of throughput for the wireless connection while the wired data interface was active (e.g., data transfer) at a coupling component (e.g., USB connector) of the user device. As shown by the graph, activity on the wired data interface may reduce a throughput of the wireless interface by approximately 60 percent.

A third line 506 indicates an improvement in throughput provided by a conductive collar on a receptacle of the coupling component, which may limit a decrease in throughput associated with the wired data interface to approximately ten percent to twenty percent. In other words, the use of the conductive collar may improve the throughput of the wireless connection by almost a factor of two (e.g., 14.4 Mbps to 30.2 Mbps at −80 dBm receive power) when the wired data interface is active. This reduction or mitigation of desense caused by the wired data interface can be effective to approximately double a range of the user device's wireless interface (e.g., in terms of linear distance to a wireless access point or another device).

As another example of improved wireless performance provided by a conductive receptacle collar, consider FIG. 5B, which depicts at 550 a table of example wireless receiver sensitivity metrics of a device that included a conductive receptacle collar implemented as described herein. As shown at 550, a user device that includes a conductive collar on a wired data interface receptacle was able to achieve approximately 10 dBm in wireless interface sensitivity. This can be effective to improve a throughput and/or range of the wireless data interface, such as described with reference to FIG. 5A.

FIGS. 6A-8B illustrate various example configurations for a conductive receptacle collar implemented in accordance with one or more aspects described herein. Although shown as separate examples (e.g., designs or models), any of the features depicted or described with reference to FIGS. 6A-8B can be combined with those of other examples of FIGS. 6A-8B, the environment, and assemblies described with reference to FIGS. 1-4, the method(s) of FIG. 9, and/or the user device of FIG. 10.

Figure 6A:
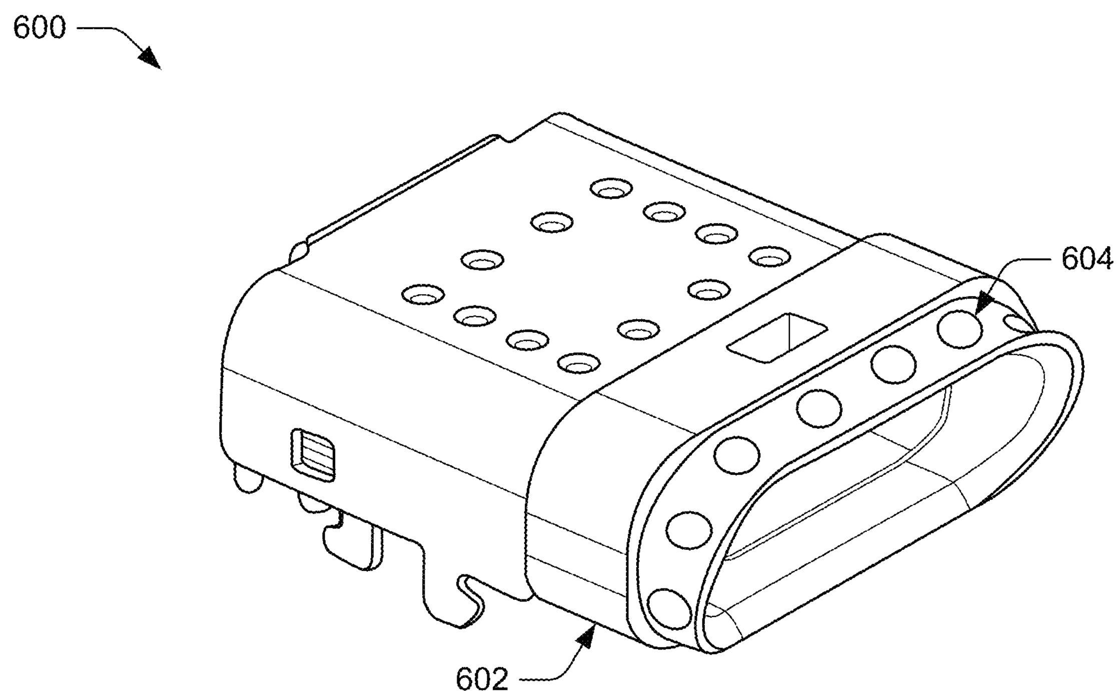
FIG. 6A illustrates an example coupling component that includes a receptacle collar with conductive grip features.
Figure 6B:
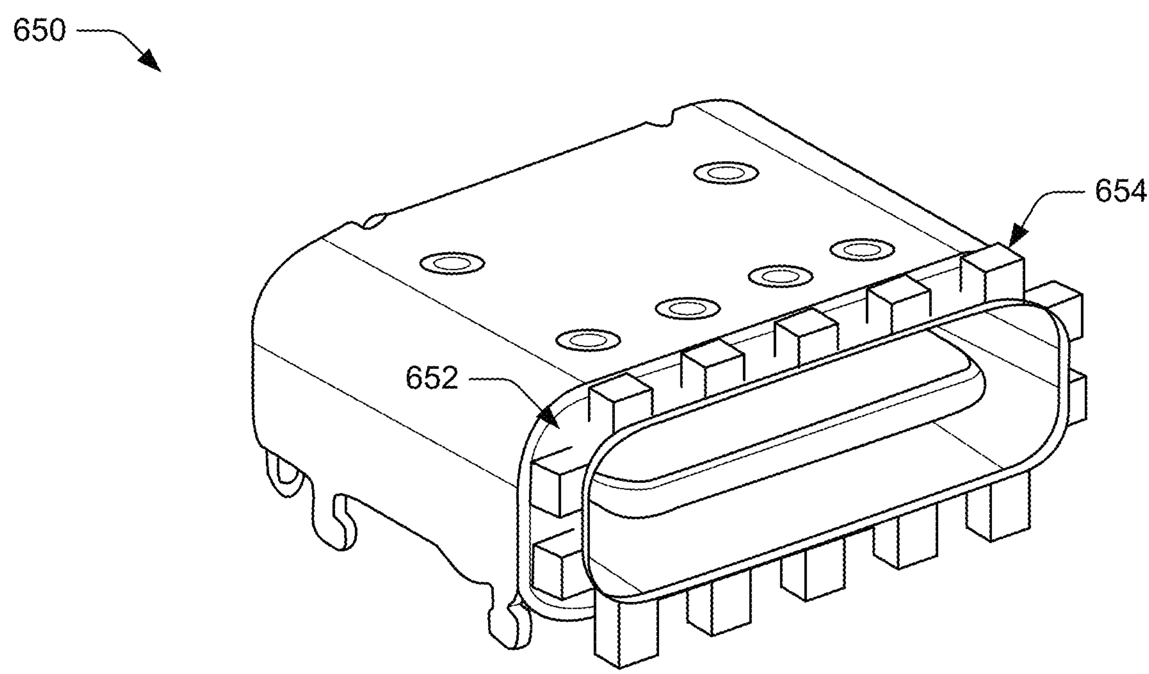
FIG. 6B illustrates another example coupling component that includes a receptacle collar with conductive grip features.

FIG. 6A illustrates at 600 an example coupling component that includes a receptacle collar with conductive grip features. In this example, a conductive receptacle collar 602 includes multiple conductive grips 604 or bumps around a portion of the collar that extends towards an opening of a receptacle. As another example, consider FIG. 6B, which illustrates at 650 an example model of a receptacle collar with conductive grip features. A conductive receptacle collar 652 includes multiple conductive grips 654 or bumps that extend outward from the receptacle. Generally, the multiple conductive grips 654 may be configured to contact an interior surface of a device enclosure in accordance with one or more aspects described herein.

Figure 7A:
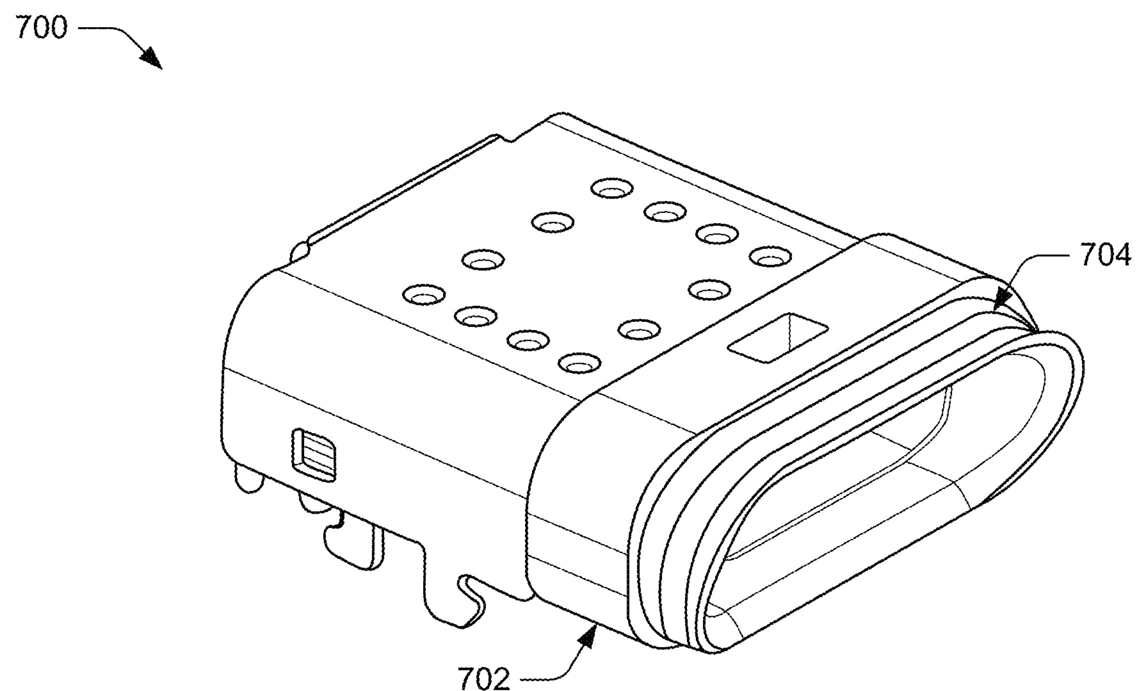
FIG. 7A illustrates a further example coupling component that includes a receptacle collar wrapped with a conductive film.
Figure 7B:
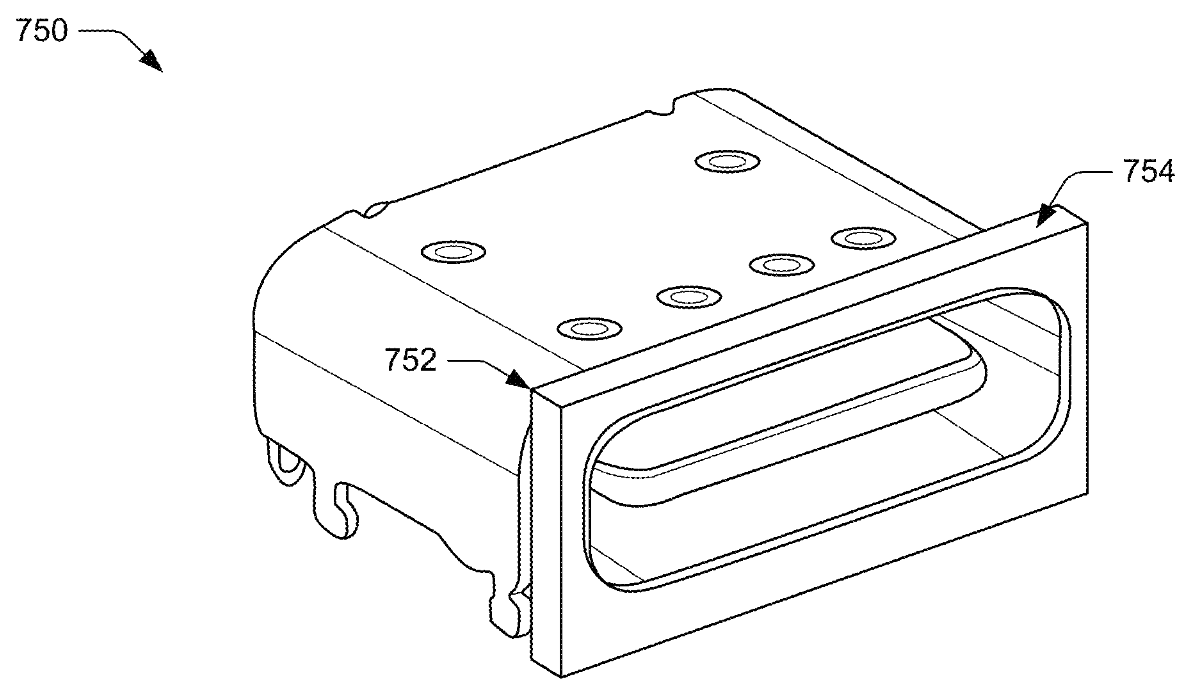
FIG. 7B illustrates an additional example coupling component that includes a receptacle collar wrapped with a conductive film.

FIG. 7A illustrates at 700 another example coupling component that includes a receptacle collar wrapped with a conductive film In this example, a conductive receptacle collar 702 includes a band of conductive film 704 around a portion of the collar that extends towards an opening of a receptacle. In some cases, the band of conductive film 704 includes or covers a profile of the collar that extends outward from the receptacle to enable contact with an interior surface in an opening of a device enclosure. As another example, consider FIG. 7B, which illustrates at 750 an example model of a receptacle collar with a conductive film wrap. In this example, a conductive receptacle collar 752 includes a conductive film wrap 754 formed over a flange-shaped extension of the collar that is configured to contact an interior surface of an opening in a device enclosure.

Figure 8A:
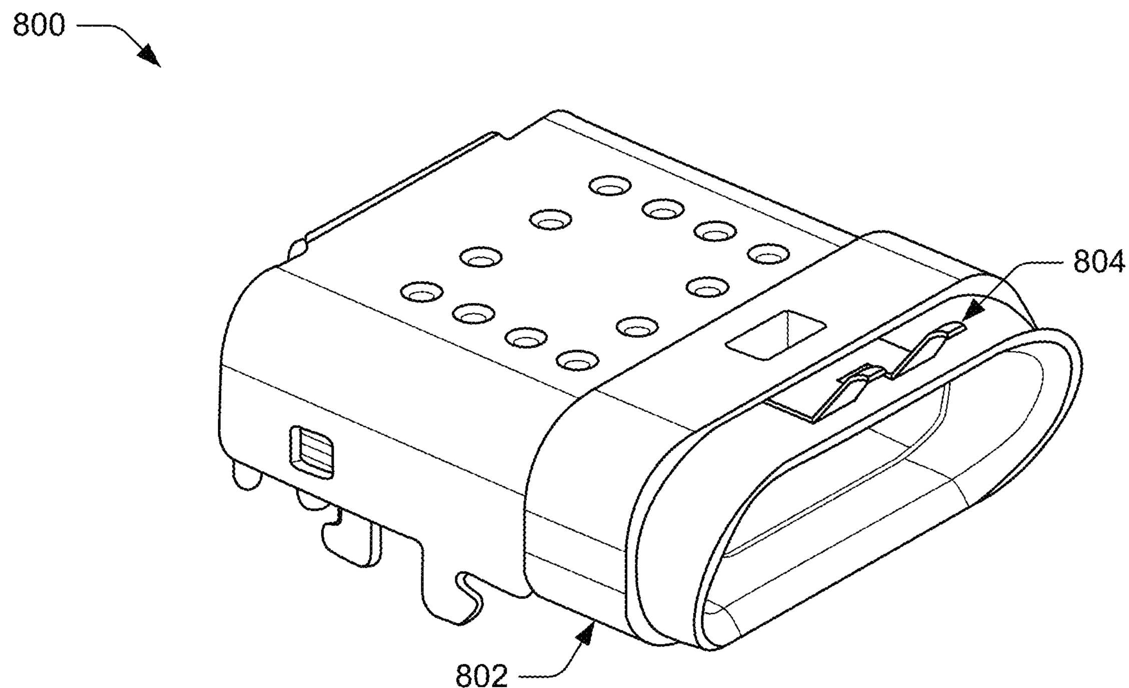
FIG. 8A illustrates yet another example coupling component that includes a receptacle with a conductive flange.
Figure 8B:
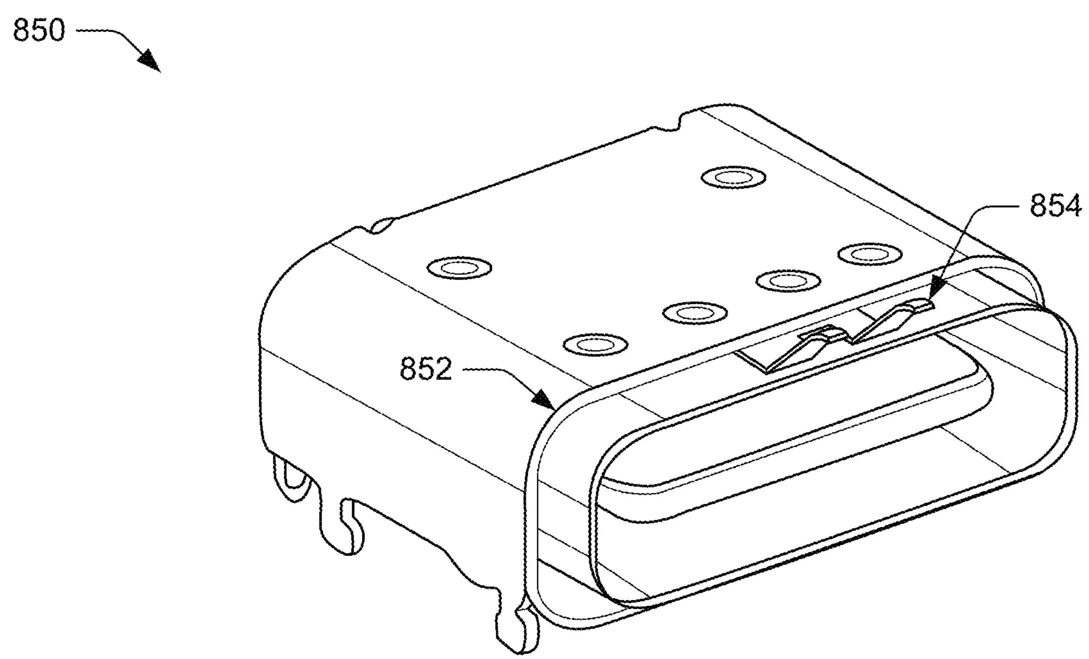
FIG. 8B illustrates yet a further example coupling component that includes a receptacle with a conductive flange.

FIG. 8A illustrates at 800 yet another example coupling component that includes a receptacle with a conductive flange. In this example, a conductive receptacle collar 802 includes a flange 804 that extends from the collar and above the receptacle of the coupling component. In some cases, one or more flanges of the receptacle collar extend outward from the receptacle to enable contact with an interior surface in an opening of a device enclosure. As another example, consider FIG. 8B, which illustrates at 850 another example coupling component that includes a housing with a conductive flange (e.g., finger or spring). In this example, a metal housing 852 of the coupling component includes a flange 854 that extends from the housing and above the receptacle of the coupling component. The flange 854 may extend downward to the receptacle and then upward, away from the receptacle, such as to enable contact with an interior surface in an opening of a device enclosure. Thus, one or more flange features of the metal housing 852 may electrically contact and couple the receptacle and the surface of the opening of the device enclosure.

Example Methods

Example method(s) 900 are described with reference to respective FIG. 9 in accordance with one or more aspects of a conductive receptacle collar and associated component assemblies. The order in which the method blocks are described is not intended to be construed as a limitation, and any number of the described method blocks can be skipped or combined in any order to implement a method or an alternate method. Generally, any assembly or use of the materials, components, methods, and operations described herein can be implemented using software, firmware, hardware (e.g., fixed logic circuitry), manual processing, automated placement, or any combination thereof. Some operations of the example methods may be described in the general context of executable instructions stored on computer-readable storage memory that is local and/or remote to a computer processing system, component assembly machine (e.g., pick, place, and/or solder assembly process), and implementations can include software applications, programs, functions, automations, and the like.

Figure 9:
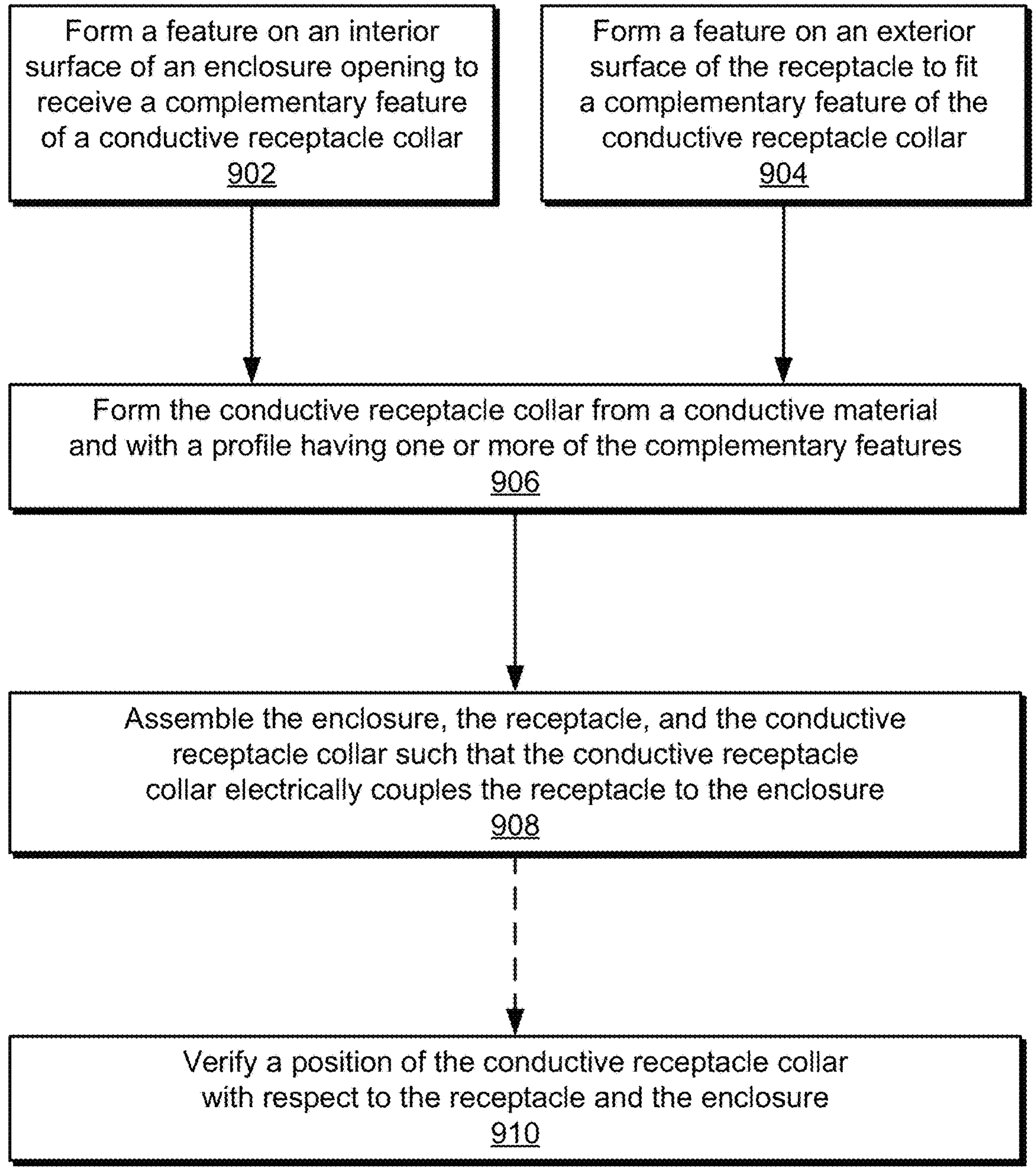
FIG. 9 illustrates an example method for implementing a conductive collar for a receptacle of an apparatus in accordance with one or more aspects.

FIG. 9 illustrates example method(s) 900 for implementing a conductive collar for a receptacle of an apparatus (e.g., user device) as generally relating to forming and assembling the conductive collar and various components of the apparatus. Optionally at block 902, a feature is formed on an interior surface of an enclosure opening to receive a complementary feature of a conductive receptacle collar. The feature on the interior surface of the enclosure opening may include a channel or dimple having a shape that is complementary to a profile of the conductive receptacle collar.

Optionally at block 904, a feature is formed on an exterior surface of the receptacle to fit or mate with a complementary feature of the conductive receptacle collar. The feature formed on the exterior surface of the receptacle may include a ridge or groove to index or position the conductive receptacle collar. Alternatively or additionally, a housing of a coupling component may include a feature to index or position the conductive receptacle collar. In some cases, the conductive receptacle collar includes a feature or geometry that enables indexing or positioning based on the feature of the receptacle surface or housing of the coupling component.

At block 906, the conductive receptacle collar is formed with or from a conductive material. In some cases, the material from which the conductive receptacle collar is formed includes a flexible conductive material. In other cases, a conductive film may be applied to a receptacle collar formed from a non-conductive material. The conductive receptacle collar may also be formed with a profile having one or more of the complementary features to fit or mate with the interior surface of the enclosure and/or the exterior surface of the receptacle.

At block 908, the enclosure, the receptacle, and the conductive receptacle collar are assembled such that the conductive receptacle collar electrically couples or grounds the receptacle to the enclosure. At one or more steps of assembly, the conductive receptacle collar may be positioned or indexed such that the conductive receptacle collar provides an electrical or ground path between the enclosure and the receptacle of the apparatus.

Optionally, at block 910, a position of the conductive receptacle collar is verified with respect to the receptacle and the enclosure. For example, the position of the conductive receptacle collar may be verified after assembly of the enclosure, the receptacle, and the conductive receptacle collar to verify that the conductive receptacle collar contacts both the receptacle and the enclosure without impeding access to the receptacle of the apparatus.

Example Device

Figure 10:
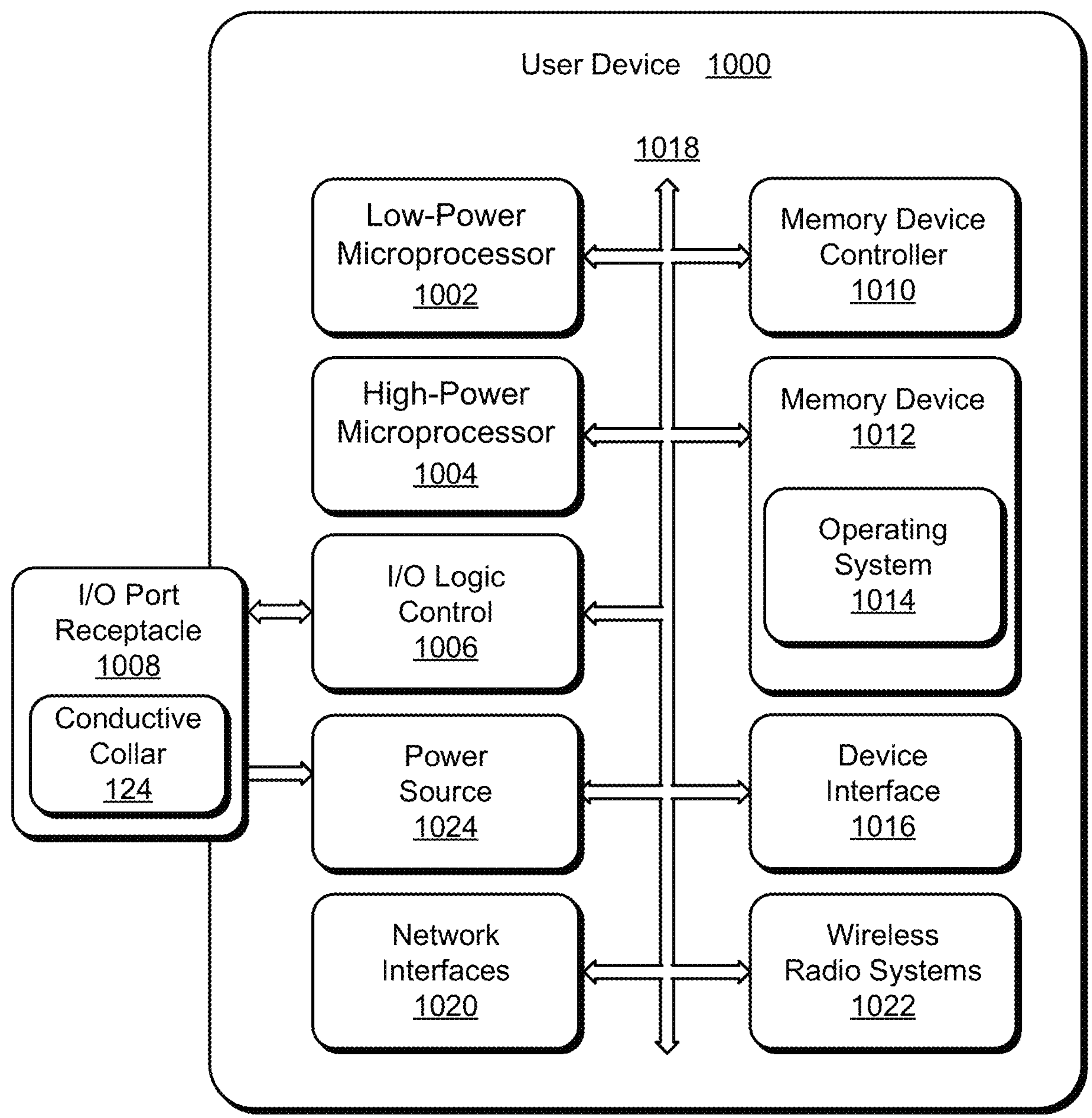
FIG. 10 depicts a block diagram of an example user device in which a conductive receptacle collar can be implemented in accordance with one or more aspects described herein.

FIG. 10 illustrates various components of an example user device 1000 in which a conductive receptacle collar can be implemented. The conductive receptacle collar may be implemented in accordance with one or more aspects described with reference to FIGS. 1-8B and/or using the method(s) as described with FIG. 9. The components of the user device 1000 described with reference to FIG. 10 can be integrated with electronic circuitry, microprocessors, memory, input-output (I/O) logic control, communication interfaces, and components, as well as other hardware, firmware, and/or software to implement the device in a user environment or wireless network.

In this example, the user device 1000 includes a low-power microprocessor 1002 and/or a high-power microprocessor 1004 (e.g., microcontrollers or digital signal processors) that process executable instructions. The microprocessors can include components of an integrated circuit, programmable logic device, a logic device formed using one or more semiconductors, and other implementations in silicon and/or hardware, such as a processor and memory system implemented as a system-on-chip (SoC). Alternatively or additionally, the device can be implemented with one or more of various software, hardware, firmware, or fixed logic circuitry that may be implemented with processing and control circuits. The low-power microprocessor 1002 and the high-power microprocessor 1004 can also support one or more different device functionalities of the device. For example, the high-power microprocessor 1004 may execute computationally intensive operations, whereas the low-power microprocessor 1002 may manage less-complex processes. The low-power microprocessor 1002 may also wake or initialize the high-power microprocessor 1004 for computationally intensive processes.

The device also includes an input-output (I/O) logic control 1006 (e.g., to include electronic circuitry). The I/O logic control 1006 can include an I/O controller for a wired data interface of the user device 1000 that is operably coupled to an I/O port receptacle 1008. For example, the user device 1000 may include respective I/O controllers for USB, Thunderbolt™, and/or Display Port™ interfaces, which are operably coupled to the I/O port receptacle 1008. The I/O receptacle port 1008 of the user device 1000 includes a conductive collar 124 implemented in accordance with one or more aspects described herein. In some cases, the conductive collar 124 improves grounding or electrical coupling of the I/O port receptacle 1008 to a chassis, housing, or enclosure (not shown) of the user device 1000. In such cases, the conductive collar 124 may reduce the propagation of high-mode current from the I/O port receptacle to antennas or radio-frequency (RF) paths of the user device 1000, which mitigates the desense of wireless interfaces of the user device 1000.

In aspects, the user device 1000 includes sensors (not shown) that enable detection of various properties in an environment of the user device. Examples of these properties or environmental variations include acceleration, temperature, humidity, water, supplied power, proximity, external motion, device motion, sound signals, ultrasound signals, light signals, fire, smoke, carbon monoxide, Global Navigation Satellite System (GNSS) signals, RF, other electromagnetic signals or fields, or the like. As such, the sensors may include any one or a combination of temperature sensors, humidity sensors, hazard-related sensors, other environmental sensors, accelerometers, microphones, optical sensors up to and including cameras (e.g., charged coupled-device or video cameras), active or passive radiation sensors, GNSS receivers, and radio-frequency identification detectors. In implementations, the user device 1000 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The user device 1000 includes a memory device controller 1010 and a memory device 1012, such as any type of nonvolatile memory and/or other suitable electronic data storage device. The user device 1000 can also include various firmware and/or software, such as an operating system 1014 that is maintained as computer-executable instructions by the memory and executed by a microprocessor. The user device 1000 also includes a device interface

1016 to interface with another device or peripheral component and includes an integrated data bus 1018 that couples the various components of the wireless user device for data communication between the components. The data bus in the wireless user device may also be implemented as one or a combination of different bus structures and/or bus architectures.

The device interface 1016 may receive input from a user and/or provide information to the user (e.g., as a user interface), and a received input can be used to determine a setting. The device interface 1016 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 1016 may also receive inputs from any number of peripherals, such as buttons, a keypad, a switch, a microphone, and an imager (e.g., a camera device).

The user device 1000 can include network interfaces 1020, such as a wireless network interface for communication with other wireless user devices or network devices in a wireless network, and an external network interface for network communication, such as via the Internet. The user device 1000 also includes wireless radio systems 1022 for wireless communication with other wireless devices via the wireless network interface and for multiple, different wireless communications systems. The wireless radio systems 1022 may include Wi-Fi, Bluetooth™, Bluetooth™ Low Energy (BLE), Mobile Broadband, and/or point-to-point IEEE 802.15.4. Each of the different radio systems can include a radio device, antenna, and chipset that is implemented for a particular wireless communications technology. The user device 1000 also includes a power source 1024, such as a battery and/or to connect the device to line voltage. In aspects, an AC/DC power source may also be used to charge the battery of the device through the I/O receptacle port 1008 (e.g., USB-C or Thunderbolt™) of the user device 1000.

Although the above-described components, configurations, methods, and devices are described in the context of a conductive receptacle collar for desense mitigation, the described components, configurations, methods, or devices are non-limiting, and aspects thereof may apply to other contexts, systems, devices, electronic assemblies, or wireless communication environments.

What is claimed is:

1. An apparatus comprising:

a printed circuit board assembly (PCBA) that includes an integrated circuit (IC) with signal lines for a wired data interface;

a coupling component that includes a receptacle for the wired data interface, the receptacle having contacts electrically coupled to the signal lines of the IC;

an enclosure in which the PCBA is mounted, the enclosure including an opening through which the receptacle for the wired data interface is exposed; and a conductive collar disposed between an exterior surface of the receptacle and an interior surface of the opening of the enclosure, the interior surface of the opening of the enclosure comprising a recess having a shape that is complementary to a cross-sectional profile of the conductive collar and configured to index, position, or retain the conductive collar, the conductive collar in contact with the exterior surface of the receptacle and the recess of the interior surface of the opening of the enclosure.

2. The apparatus as recited in claim 1, wherein the exterior surface of the receptacle comprises a feature to index, position, or retain the conductive collar.

3. The apparatus as recited in claim 2, wherein the feature to index, position, or retain the conductive collar comprises a protrusion formed on the exterior surface of the receptacle.

4. The apparatus as recited in claim 1, wherein:

the coupling component further comprises a housing in which the receptacle is mounted; and the housing comprises a feature to index, position, or retain the conductive collar.

5. The apparatus as recited in claim 1, wherein the conductive collar comprises one of an elastomeric material, a silicone rubber material, a fluoro-silicone rubber material, or a rubber material.

6. The apparatus as recited in claim 5, wherein the conductive collar comprises particles, fragments, plated beads, or pieces of a conductive material.

7. The apparatus as recited in claim 6, wherein the conductive material comprises one or more of nickel, graphite, carbon, silver, aluminum, brass, bronze, copper, or beryllium.

8. The apparatus as recited in claim 1, wherein the conductive collar is disposed around a circumference or perimeter of the exterior surface of the receptacle of the coupling component.

9. The apparatus as recited in claim 1, wherein:

the PCBA further comprises a wireless transceiver IC that is operably connected to one or more antennas;

the enclosure comprises respective mounting features for the one or more antennas; and the conductive collar mitigates desense of the wireless transceiver IC caused in association with data that is transferred via the signal lines of the wired data interface.

10. The apparatus as recited in claim 1, wherein:

the enclosure is formed from a conductive material; or an interior surface of the enclosure and the interior surface of the opening are coated with a conductive material.

11. The apparatus as recited in claim 10, wherein the enclosure electrically couples the interior surface of the opening of the enclosure to at least one mounting point of the PCBA.

12. The apparatus as recited in claim 1, wherein the IC is configured to transfer data via the signal lines of the wired data interface in accordance with one or more of:

a Universal Serial Bus (USB) interface standard;

a Display Port™ interface protocol; or a Thunderbolt™ interface protocol.

* * * * *